United States Patent [19]

Vigo

[11] 4,377,020
[45] Mar. 22, 1983

[54] BI-ROTATIONAL HINGE

[75] Inventor: Gilles Vigo, Thillot, France

[73] Assignee: Compagnie Industrielle de Mecanismes, France

[21] Appl. No.: 246,485

[22] Filed: Mar. 23, 1981

[30] Foreign Application Priority Data

Mar. 21, 1980 [FR] France ................ 80 06312

[51] Int. Cl.³ .................................... E05D 7/04
[52] U.S. Cl. .................................... 16/329; 403/53; 296/97 K
[58] Field of Search .............. 16/379, 327, 329, 257, 16/340; 403/53, 58, 78, 93, 96, 97; 296/97 K; 248/278

[56] References Cited

U.S. PATENT DOCUMENTS

| 1,159,529 | 11/1915 | Parizek | 16/329 |
| 2,454,613 | 11/1948 | Peltier et al. | 403/53 X |
| 2,635,281 | 4/1953 | Feldberg | 16/329 X |
| 2,698,728 | 1/1955 | Hedeen | 248/278 |
| 2,698,958 | 1/1955 | Adams | 16/340 |
| 3,419,295 | 12/1968 | Small | 16/329 X |
| 4,129,280 | 12/1978 | Ruegg et al. | 248/278 X |

FOREIGN PATENT DOCUMENTS 168136  8/1959  Sweden ................ 16/386

Primary Examiner—Louis Rimrodt
Assistant Examiner—Andrew M. Falik

[57] ABSTRACT

A device for mounting a support and articulation arm of a sun-glare shield of a vehicle in which the sun-glare shield is engaged in a horizontal aperture of a bearing and in an orifice of a pull-rod member which is elastically biased upwardly. This pull-rod is guided in a support fixed to the roof of the vehicle. The support may be fixed to the roof so as to be downwardly detachable by means of an elastically expansible ring acted upon by a push-member. The latter is guided by the support and is acted upon by the upper surface of the bearing.

11 Claims, 12 Drawing Figures

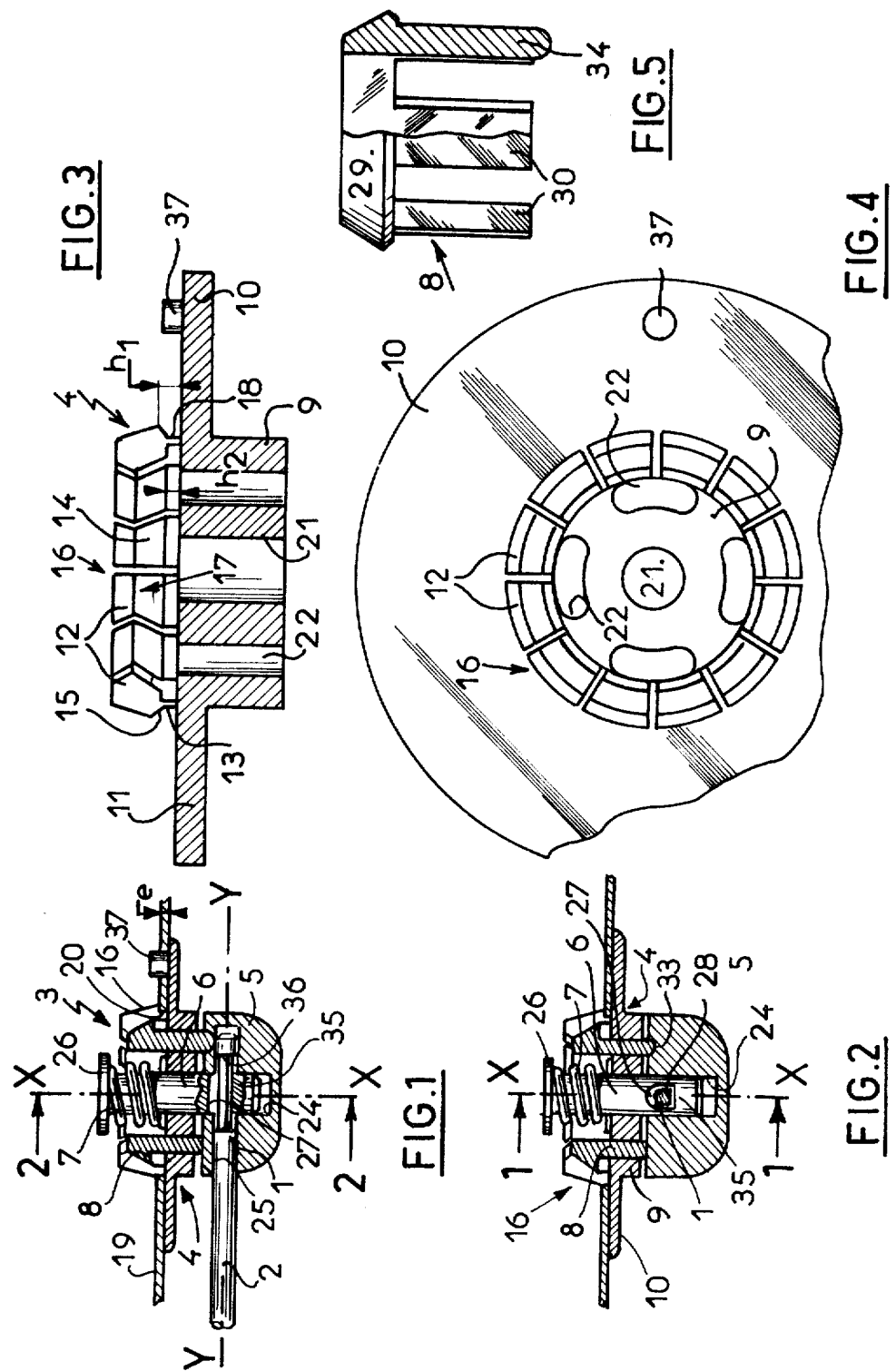

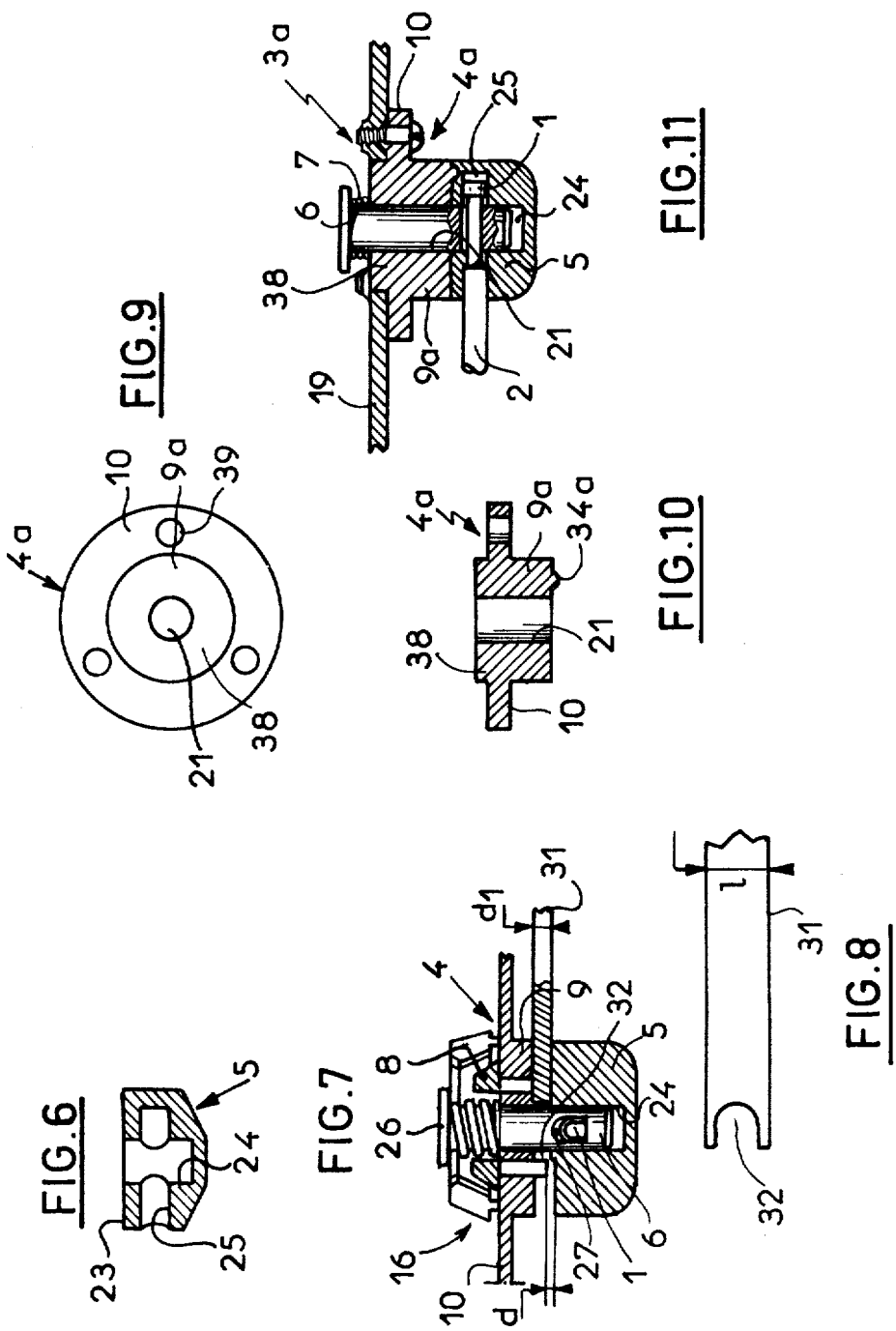

BI-ROTATIONAL HINGE

The present invention relates to a device for mounting a support and articulation arm of a sun-glare shield for a vehicle, of the type comprising a support adapted to be detachably fixed in front of an opening of a vehicle roof element and having an aperture which is substantially vertical and a bearing in said support rotatable about the axis of said aperture and having an aperture which is substantially vertical and coaxial with said aperture of the support and a substantially horizontal aperature for receiving the arm which is rotatable therein.

U.S. Pat. No. 2,698,958 discloses a device of this type which enables the arm to turn about the two axes with a given opposing torque so that the other end of the arm can be rendered rigid with the sun-glare shield.

However, in this known device, the two rotating movements comprise regulating means which are completely independent from each other and this complicates the device and renders it relatively expensive.

An object of the invention is to provide a device for mounting the arm which permits a satisfactory regulation of the two opposing torques in a cheaper manner.

The invention provides a mounting device of the aforementioned type, wherein the two apertures of the bearing intersect, a pull-rod is engaged in the two vertical apertures and has a substantially horizontal orifice for the passage of the arm, and elastically yieldable means bearing against the upper surface of the support biases the pull-rod upwardly.

This device is very suitable for obtaining a stable position of the arm about its own axis in particular corresponding to the raised position of the sun-glare shield. For this purpose, it is sufficient that the orifice of the pull-rod have a lower flat surface adapted to cooperate with a flat surface provided on the arm in the considered position of the latter.

In one embodiment, the support has on its periphery screw apertures and, if desired, on its upper surface, a projection for centering the device in the opening of the roof element.

Another arrangement retaining the indispensible possibility of dismantling the device from inside the vehicle, is the following. Projecting from the upper surface of the support is a radially expansible ring which has an upwardly convergent inner surface and a maximum outside diameter at rest which it a little greater than the diameter of said opening, and a push-member, which has leg portions extending through vertical passages of the support which surround the vertical aperture of the latter.

Further features and advantages of the invention will be apparent from the ensuing description which is given merely by way of example with reference to the drawings in which:

FIG. 1 is a sectional view taken on line 1—1 of FIG. 2 of a mounting device according to the invention;

FIG. 2 is a sectional view taken on line 2—2 of this device of FIG. 1;

FIG. 3 is a longitudinal sectional view, to an enlarged scale, of the support of the device;

FIG. 4 is a plan view of the support;

FIG. 5 is a side elevational view, with a part in section, of the push-member of the device of FIGS. 1 and 2;

FIG. 6 is a longitudinal sectional view of the bearing of the device;

FIG. 7 illustrates the mounting of this device;

FIG. 8 is a plan view of a strip employed for this mounting;

FIG. 9 is a plan view of the support of another embodiment of the mounting device according to the invention;

FIG. 10 is a longitudinal sectional view of the support of FIG. 9, and

FIG. 11 is a view similar to FIG. 1 of the mounting device employing the support of FIGS. 9 and 10.

Figure 12:
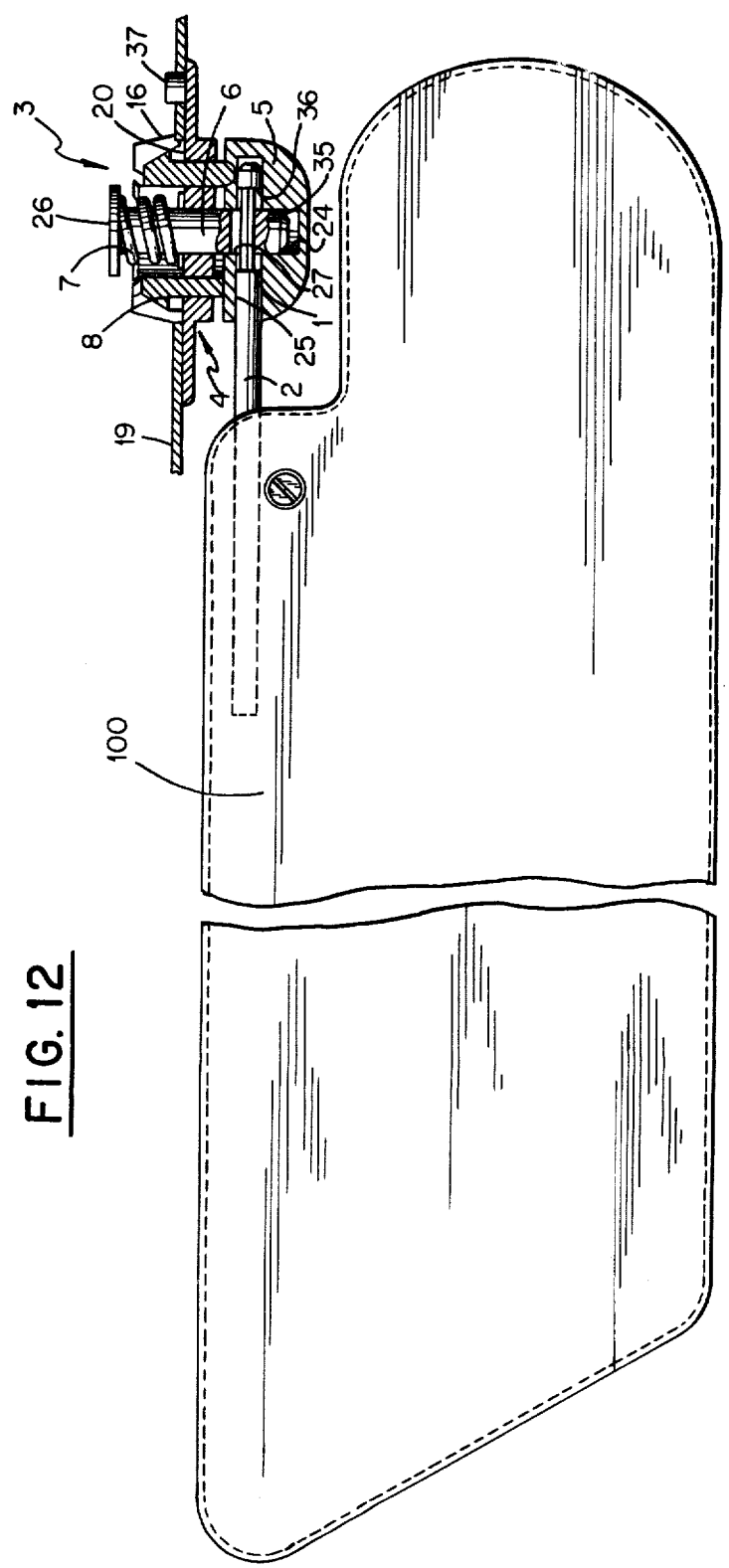
FIG. 12 is a sectional view illustrating a sun glare shield attached to the mounting device.

In the embodiment shown in FIGS. 1 to 6, the invention is applied to the mounting of one end 1 of an arm 2 having a constant cylindrical general section whose other end (not shown) is rigid with a sun-glare shield of a vehicle, so that this arm can pivot about a vertical axis X—X and a horizontal axis Y—Y. The mounting device 3 comprises five component parts, namely, a support 4, a bearing 5, a pull-rod 6, a compression coil spring 7 and a push-member 8. The parts 4, 5, 6 and 8 are of moulded plastics material.

The support 4 (FIGS. 3 and 4) has a cylindrical body 9 provided at its upper end with an outer flange 10. Projecting from the planar upper surface 11 of the assembly 9-10 is a ring arrangement of lugs 12 which are attached by a thin vertical elastically yieldable web 13 to the surface 11. Each lug 12 has a radially inner surface 14 which is upwardly inclined toward the axis X—X, for example at an angle of 60° to the horizontal. Externally, the lug 12 is connected to the web 13 by a surface 15 which is slightly inclined downwardly and toward the axis X—X, for example at an angle of 10° to the horizontal.

Each lug 12 is separated from the neighboring lugs by a radial gap. The assembly of the lugs thus constitutes an elastically expansible ring 16 which has, internally, a substantially conical surface 17 which is upwardly convergent and, externally, at its base a cylindrical groove 18 which tapers radially inwardly from a height $h_1$ to a height $h_2$. The device 3 is adapted to be mounted on a wall 19 of sheet material which internally lines a part of the roof (not shown) of the vehicle and whose thickness e is between $h_1$ and $h_2$. The wall 19 has a circular opening 20 whose diameter is slightly less than the maximum diameter of the ring 16 at rest.

A vertical aperture 21 extends through the support 4 and, around this aperture and inside the ring 16, four vertical passages 22 of arcuate shape and disposed at 90° to each other when viewed in plan, also extend through the support 4.

The bearing 5 (FIG. 6) has a generally cylindrical shape with a crowned or rounded lower part and a planar upper surface 23, the diameter of the bearing being equal to the diameter of the body 9 of the support 4. The bearing has a blind vertical aperture 24 having the same diameter as the aperture 21 of the support 4 and extending from the center of the surface 23 and intersecting a blind horizontal aperture 25 which has the same diameter as the arm 2 of the sun-glare shield.

The pull-rod 6 comprises a cylindrical rod having the same diameter as the apertures 21 and 24 and having a head 26 at its upper end. Near to its lower end, this rod has a transverse orifice 27 whose section (FIG. 2) is constituted by an upper semi-circle whose radius is half the diameter of the aperture 25, two vertical segments and a horizontal base 28.

The push-member 8 (FIG. 5) comprises a ring 29 whose outer surface is frustoconical and corresponds to the inner surface 17 of the expansible ring 16. Extending from the base of this ring 29 are four guiding leg portions 30 which are adapted to slide in the passages 22 of the support 4 and have a length exceeding the length of the passages 22 by an extent d (FIG. 7).

In order to mount the device 3, an elongated rectangular strip 31 (FIG. 8) is employed whose thickness $d_1$ is a little greater than the aforementioned extent d (FIG. 7) and whose width l is less than the circumferential gap between the leg portions 30 of the push-member 8. The strip 31 has at one end a notch 32 whose width is a little greater than the diameter of the pull-rod 6 and which opens onto the corresponding end of the strip.

The push-member 8 is placed in position on the support 4. It bears on the upper surface 11 of the latter without touching the lugs 12 which are retracted. The spring 7 is passed over the pull-rod 6, the latter is inserted in the apertures 21 and 24 and urged downwardly by compressing the spring 7, and the arm 2 is inserted in the aperture 25 through the orifice 27 of the pull-rod. The latter is then released, but the compression of the spring 7 is maintained by pulling the bearing 5 downwardly for inserting the strip 31 between two leg portions 30 of the push-member until the pull-rod 6 is located in the notch 32. The bearing 5 is then released and the device is in the state shown in FIG. 7 in which the strip 31 is clamped between this bearing and the lower surface of the body 9 of the support 4, the push-member 8 is free and consequently the ring 16 is retracted.

The ring 16 is then inserted in the opening 20 of the wall 19 until the flange 10 is applied against the lower surface of this wall and the strip 31 is withdrawn. The spring 7 consequently biases the arm 2 upwardly and this arm transmits this force to the bearing 5 and thence to the leg portions 30 of the push-member 8. The latter is applied against the inner surface 17 of the ring 16 and, by a wedging effect, the ring 16 is expanded and this results in the engagement of the groove 18 on the periphery of the opening 20 with a certain amount of force.

In this mounted state (FIGS. 1 and 2), under the effect of the spring 7, the bearing 5 bears upwardly against the planar base of the leg portions 30, the end part 1 of the arm 2 bears through two spaced-apart regions against the upper generatrix of the aperture 25 and, between these regions, against the planar base 28 of the orifice of the pull-rod 6. It will be clear that the bearing 5 can thus turn about the axis X—X with the arm 2, with a certain resistant torque, and that this arm can turn about its axis Y—Y in the bearing 5 with a certain resistant torque. The value of the two resistant torques is determined by the stiffness of the spring 7, by the coefficients of friction of the materials employed for the various component parts of the device 3 and for the arm 2, and by the areas of the rubbing surfaces.

As shown in FIGS. 1 and 2, means may be provided for ensuring a plurality of stable positions of the arm, on one hand, when rotating about the axis X—X, one or more cavities 33 provided in the planar upper surface of the bearing 5 cooperate with a small rounded projection 34 (FIG. 5) which projects from the base of a leg portion 34; on the other hand, when rotating about the axis Y—Y, the arm 2 has a flat surface 35 which cooperates with the planar base 28 of the orifice of the pull-rod 6 when the sun-glare shield is in its raised inoperative position. Other flat surfaces may of course be added to the arm 2 if desired. As shown in FIG. 1, the flat surface 35 is formed in a region of the arm 2 of slightly reduced diameter which forms close to the end of the arm a shoulder 36 which precludes the accidental extraction of the arm 2 from the aperture 25. However, other axial retaining means may be provided instead of this shoulder. A stud 37 projecting from the upper surface of the flange 10 of the support 4 positions the latter angularly about the axis X—X by penetrating an aperture provided to one side of the opening 20 in the wall 19.

In order to dismantle the device 3, it is sufficient to pull the bearing 5 downwardly. This releases the push-member 8 which resumes its position shown in FIG. 7 and allows the ring 16 to retract to a diameter less than that of the opening 20 under the effect of the pull exerted on the support 4 through the pull-rod 6 and owing to the inclination of the surface 15 of the lugs 12. The assembly can then be extracted downwardly.

FIGS. 9 to 11 show a simplified embodiment 3a which is devoid of a push-member. The support 4a no longer has an expansible ring 16 and passageways 22 but has a raised centre portion 38 having the same diameter as the opening 20 and a plurality of peripheral screw apertures 39. Apart from the manner of fixing the support 4a to the roof element 19, provided with suitable tapped apertures, and apart from the fact that the planar upper surface of the bearing 5 is in direct rubbing contact with the lower planar surface of the body 9a of the support 4a, the device 3a is identical to the device 3 and operates in the same manner.

In order to permit the bearing 5 to assume stable angular positions, a projection 34a is of course provided on the lower surface of the body 9a.

By way of a modification, the axes X—X and Y—Y may be only roughly perpendicular to each other, and the axis X—X may be more or less inclined to the vertical. Further, the spring 7 may be replaced by a sleeve of elastomer, a Belleville washer or the like. The pull-rod 6 may be of press-formed sheet material. The outer shape of the body 9 of the support 4 and the outer shape of the flange 10 and of the bearing 5 are not critical and may be chosen by the constructor. The angular positioning of the support 4 in FIGS. 1 to 6 may be achieved by means other than the stud 37, for example by an asymmetry of the opening 20 formed by an internal projection which penetrates between two lugs of the expansible ring 16.

Another modification (not shown) of the device of FIGS. 1 to 6 is as follows. Some of the lugs 12 of the expansible ring 16 are eliminated and all the remaining lugs 12 overhang the passages 22. Further, the push-member 8 is inverted, its ring 29 is cylindrical and the leg portions 30 extend upwardly from the ring 29 and have at their upper end a frustoconical surface which corresponds to the inner surface 17 of the ring 16. The rounded projection 34 projects from the lower surface of the ring 29. When assembling, the leg portions 30 are inserted upwardly in the passageways 22 and, when the strip 31 is withdrawn, it is the upper end of these leg portions which engage and act on the inner surface 17 of the ring 16 and cause the expansion of the latter.

It will be understood that the part of the arm 2 outside the bearing 5 may be provided with any covering, and in particular a trimming which matches that of the sun-glare shield.

Having now described my invention, what I claim as new and desire to secure by Letters Patent is:

1. A device for mounting a support and articulation arm of a sun-glare shield of a vehicle, the device comprising a support for detachably fixing on a roof element of the vehicle in alignment with an opening in said roof element, the support defining a substantially verticle first aperture, a bearing defining a substantially vertical second aperture which is coaxial with the first aperture and a substantially horizontal third aperture for receiving the arm for rotation of the arm in the second aperture, the second and third apertures intersecting each other, a pull-rod defining a substantially horizontal orifice for the passage of the arm and engaged in the first and second apertures so as to rotatively mount the bearing on the support, and elastically yieldable means interposed between the support and the pull-rod and biasing the pull-rod upwardly for angularly positioning said bearing in at least one position relative to said support comprising at least one projection on said bearing and said cavity means on a support engageable by said projection.

2. A device according to claim 1, wherein the orifice of the pull-rod has a lower flat surface cooperating with a flat surface provided on the arm in a predetermined position of the arm about a longitudinal axis of the arm.

3. A device according to claim 2, comprising means for axially retaining the arm relative to the pull-rod.

4. A device according to claim 1, wherein the elastically yieldable means is a coil spring surrounding the pull-rod and compressed between a head provided on an upper end of the pull-rod and a surface of the support.

5. A device according to claim 1 in combination with said roof element, said support being provided with an eccentric projection, said eccentric projection engages an aperture which is provided in the roof element and located to one side of said opening whereby the support is angularly positioned relative to the roof element.

6. A device according to claim 1, wherein the support defines screw passage apertures adjacent the periphery of the support for screwing the support to the roof element.

7. A device according to claim 6, comprising a projection on an upper surface of the support for centering the support in said opening of the roof element.

8. A device according to claim 1, 2, 3, or 4, wherein the support has vertical passages surrounding said first aperture, a radially expansible ring projects from an upper surface of the support and defines an upwardly convergent inner surface and has a maximum diameter at rest which is a little greater than the diameter of said opening, and a push-member which has leg portions extending through said vertical passages and has in an upper part thereof means defining an upwardly convergent peripheral surface adapted to act on said inner surface of the expansible ring.

9. A device according to claim 7, wherein the expansible ring defines, at its base, a groove which tapers from an axial height exceeding the thickness of the roof element to an axial height which is less than said thickness.

10. A device according to claim 8, comprising a strip member which defines, at one end thereof, a notch whose width is equal to at least the diameter of the pull-rod and which is insertable between the support and the bearing in passing between two of said leg portions of the push-member.

11. A device according to claim 9, comprising a strip member which defines, at one end thereof, a notch whose width is equal to at least the diameter of the pull-rod and which is insertable between the support and the bearing in passing between two of said leg portions of the push-member.

* * * * *